(12) United States Patent
Numata et al.

(10) Patent No.: US 11,858,352 B2
(45) Date of Patent: Jan. 2, 2024

(54) VEHICLE

(71) Applicants: JATCO LTD, Fuij (JP); Nissan Motor Co., Ltd., Yokohama (JP)

(72) Inventors: Kazuya Numata, Kanagawa (JP); Satoru Naruoka, Kanagawa (JP); Yusuke Ienaka, Kanagawa (JP); Kazuhiro Nishimura, Kanagawa (JP); Taku Maezono, Kanagawa (JP); Tatsuya Kumagai, Kanagawa (JP); Yutaka Okumura, Shizuoka (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 457 days.

(21) Appl. No.: 17/277,546

(22) PCT Filed: Sep. 25, 2019

(86) PCT No.: PCT/JP2019/037597
§ 371 (c)(1),
(2) Date: Mar. 18, 2021

(87) PCT Pub. No.: WO2020/084989
PCT Pub. Date: Apr. 30, 2020

(65) Prior Publication Data
US 2021/0331572 A1 Oct. 28, 2021

(30) Foreign Application Priority Data
Oct. 26, 2018 (JP) .................. 2018-202176

(51) Int. Cl.
*B60K 5/12* (2006.01)
*F16H 57/025* (2012.01)
*B60R 16/02* (2006.01)

(52) U.S. Cl.
CPC .......... *B60K 5/1216* (2013.01); *B60K 5/1266* (2013.01); *F16H 57/025* (2013.01); *B60R 16/0215* (2013.01)

(58) Field of Classification Search
CPC ...... B60K 5/1216; B60K 5/1266; B60K 5/12; B60K 5/1208; F16H 57/025; B60R 16/0215; B60R 16/0207
See application file for complete search history.

(56) References Cited

U.S. PATENT DOCUMENTS

| 10,099,551 B2 * | 10/2018 | Iwasaki | ................ B60K 17/354 |
| 10,894,471 B2 * | 1/2021 | Yokoyama | .............. B60R 16/04 |
| 2019/0031011 A1 * | 1/2019 | Fujiaki | .................. F16H 57/025 |

FOREIGN PATENT DOCUMENTS

| DE | 102018211114 A1 * | 1/2019 | ............. B60K 17/04 |
| JP | S59-188340 U | 12/1984 | |

(Continued)

*Primary Examiner* — John D Walters
(74) *Attorney, Agent, or Firm* — Global IP Counselors, LLP

(57) ABSTRACT

A vehicle includes a case member, a stay member and a rib. The case member is supported by a frame of a vehicle body with a mount member being interposed. The stay member is suspended between a boss part of the case member and a member of a case member side in the mount member, a longitudinal direction of the stay member intersecting a longitudinal direction of the frame. The rib extends in the case member in a direction that is an extension of the longitudinal direction of the stay member at a root of the boss part.

4 Claims, 7 Drawing Sheets

(56) References Cited

FOREIGN PATENT DOCUMENTS

| | | |
|---|---|---|
| JP | 2004-243872 A | 9/2004 |
| JP | 2006-297961 A | 11/2006 |
| JP | 2013-185601 A | 9/2013 |
| JP | 2018-058442 A | 4/2018 |

* cited by examiner

VEHICLE

This is a U.S. national phase application of PCT/JP2019/037597, filed on Sep. 25, 2019, which claims priority to Japanese Patent Application No. 2018-202176, filed on Oct. 26, 2018. The entire disclosure of Japanese Patent Application No. 2018-202176 is hereby incorporated herein by reference.

TECHNICAL FIELD

The present invention relates to a vehicle.

BACKGROUND ART

Disclosed in Japanese Unexamined Patent Publication No. 2018-58442 is a structure in which a transmission case is supported by a vehicle body (side frame) with a mount member interposed.

In the structure disclosed in Patent Document 1, if the rigidity of the frame of the vehicle body is high, the vibration sound is reduced, but in the case of that structure, there are cases when the rigidity is weak in the direction intersecting the longitudinal direction of the frame of the vehicle body, and this weak rigidity can be a cause of vibration sound.

For that reason, there is a need to increase the rigidity in the direction intersecting the longitudinal direction of the frame of the vehicle body.

SUMMARY

According to one aspect of the present disclosure, a vehicle includes a case member, a stay member and a rib. The case member is supported by a frame of a vehicle body with a mount member being interposed. The stay member is suspended between a boss part of the case member and a member of a case member side in the mount member, a longitudinal direction of the stay member intersecting a longitudinal direction of the frame. The rib extends in the case member in a direction that is an extension of the longitudinal direction of the stay member at a root of the boss part.

According to the present disclosure, it is possible to increase the rigidity in the direction intersecting the longitudinal direction of the frame of the vehicle body.

DETAILED DESCRIPTION OF EMBODIMENTS

Following, an explanation is given using an example when the vehicle of the present invention is a vehicle V comprising a belt type continuously variable transmission 1.

Figure 1:
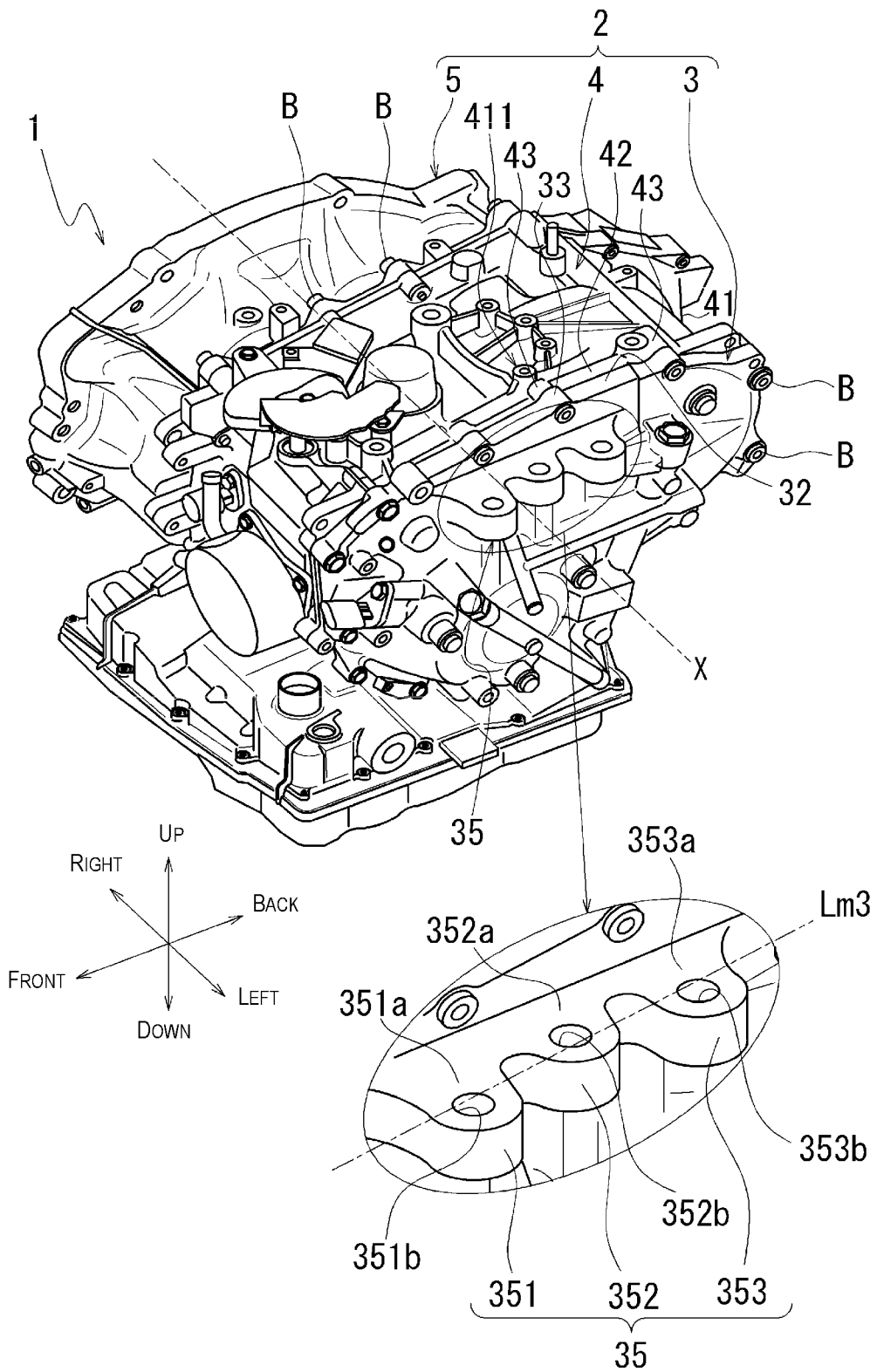
FIG. 1 is a drawing for explaining a continuously variable transmission.

FIG. 1 is a drawing for explaining a continuously variable transmission 1, and is a perspective view of the continuously variable transmission 1 seen from a side cover 3 side.

Figure 2:
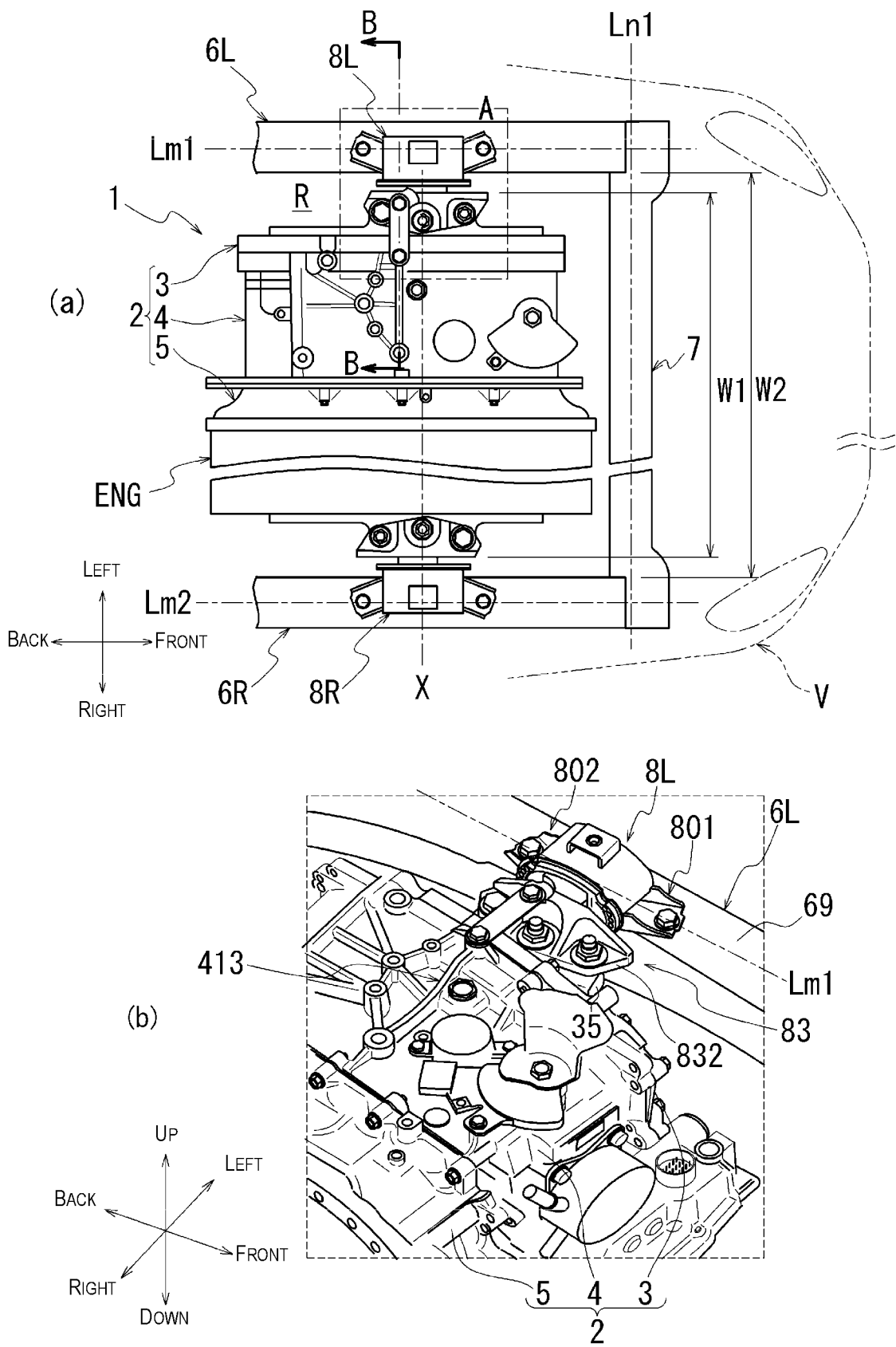
FIG. 2 is a drawing for explaining an engine room.

FIG. 2 is a drawing for explaining an engine room R of the vehicle V. (a) is a plan view of the engine room R. The contour of the vehicle V is shown by a virtual line. (b) is a perspective view of region A shown in FIG. 2 (a).

The front-back direction, left-right direction, and up-down direction in the drawings are explained as items respectively showing the direction seen from a driver who has boarded the vehicle V. Also, for convenience of explanation, a wire harness H is omitted.

As shown in FIG. 1, a transmission case 2 of the continuously variable transmission 1 is configured from the side cover 3, a case 4, and a converter housing 5. A rotating body such as a transmission mechanism or a friction engagement element, etc., that is not illustrated is housed inside the transmission case 2.

In the transmission case 2, the side cover 3 is attached from one side sandwiching the case 4 (paper surface front side in FIG. 1), and the converter housing 5 is attached from the other side (paper surface back side in FIG. 1). The case 4 and the side cover 3 are fixed by bolts B. The case 4 and the converter housing 5 are fixed by bolts B.

As shown in FIG. 2 (a), an engine ENG is adjacent at the converter housing 5 side of the transmission case 2. In specific terms, in the transmission case 2, the engine ENG is attached in a state with the overlapping direction of the side cover 3, the case 4, and the converter housing 5 matching a rotation axis X direction of a crank shaft (not illustrated) of the engine ENG (see FIG. 1, FIG. 2 (a)).

A rotation drive force around the rotation axis X is input by the crank shaft of the engine ENG to the continuously variable transmission 1. This rotation drive force is transmitted to drive wheels (not illustrated) after shifting by the transmission mechanism within the transmission case 2.

As shown in FIG. 2 (a), the vehicle V has the engine room R at the front side in the front-back direction of the vehicle V. The engine ENG and the continuously variable transmission 1 are housed in the engine room R. The engine ENG is housed in the engine room R in a state with the rotation axis X of the crank shaft matching the left-right direction of the vehicle V. The continuously variable transmission 1 is placed at the left side of the engine ENG in the left-right direction of the vehicle V. In the left-right direction of the vehicle V, a length W1 combining the engine ENG and the continuously variable transmission 1 is slightly shorter than a length W2 of the engine room R (W1<W2).

Side members 6 (6L, 6R) of the vehicle V are placed at the left side and right side sandwiching the engine room R in the left-right direction of the vehicle V. The side members 6 (6L, 6R) are rail members made of steel plates respectively extending along straight lines Lm1, Lm2 parallel to the front-back direction of the vehicle V.

As shown in FIG. 2 (a), the front end parts (right side in FIG. 2 (a)) of the side members 6 (6L, 6R) in the front-back direction of the vehicle V are connected by a front cross member 7. The front cross member 7 is a rail member made of a steel plate extending along a straight line Ln1 orthogonal to the straight line Lm1 and the straight line Lm2. The straight line Ln1 is a straight line parallel to the left-right direction of the vehicle V.

Though an illustration is omitted, the back end parts of the side members 6 (6L, 6R) are connected by a dash panel.

The engine room R is a space surrounded by these side members 6 (6L, 6R), the front cross member 7, and the dash panel.

As shown in FIG. 2 (a), in the left-right direction of the vehicle V, the side cover 3 of the transmission case 2 faces the side member 6L, and the right side surface of the engine ENG faces the side member 6R.

In the left-right direction of the vehicle V, mount members 8 (8L, 8R) are provided at the respective parts of the side members 6 (6L, 6R) facing the engine ENG and the transmission case 2. The engine ENG and the transmission case 2 are supported by the side members 6 (6L, 6R) with the mount members 8 (8L, 8R) interposed.

Figure 3:
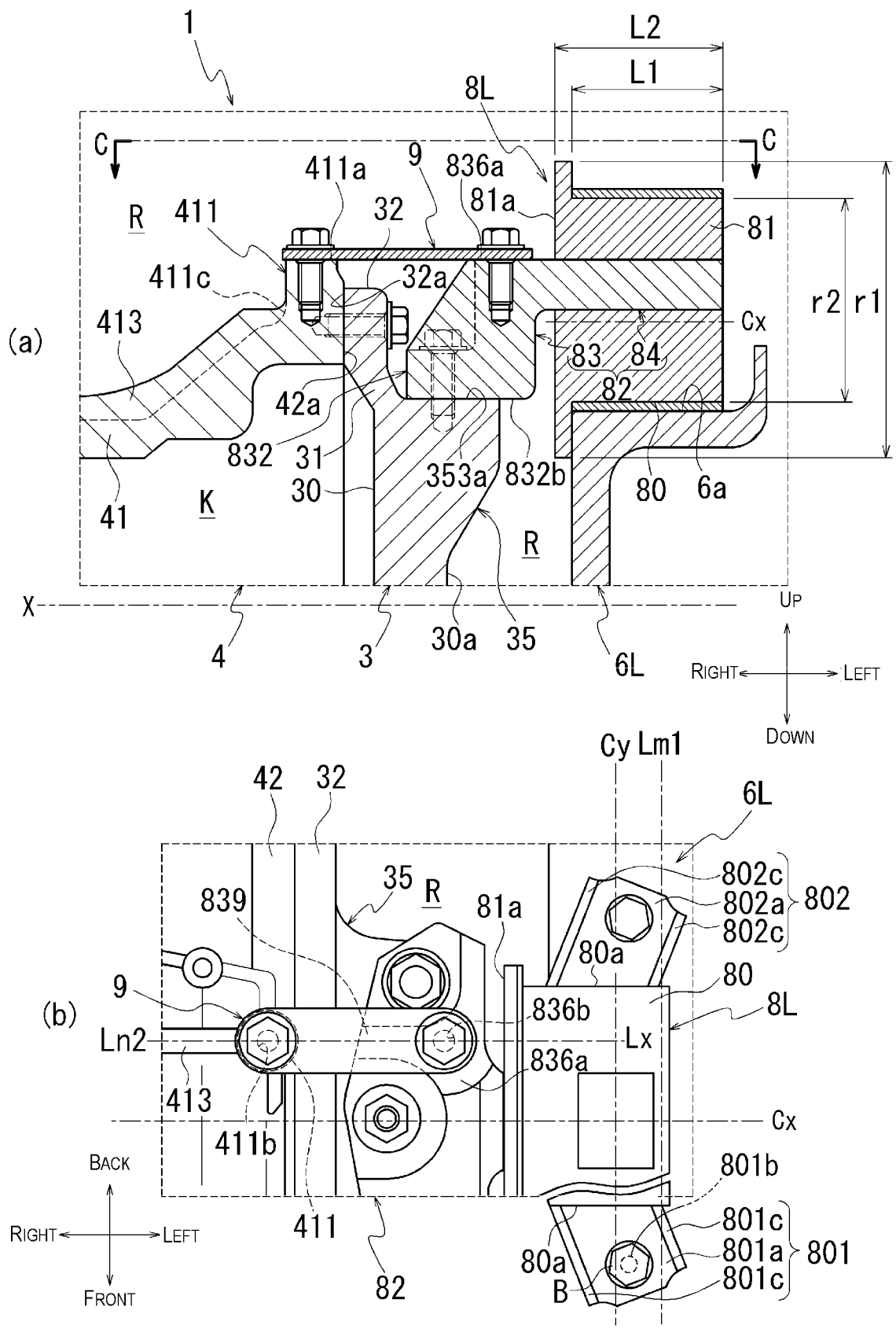
FIG. 3 is a drawing for explaining a support structure of the continuously variable transmission.

FIG. 3 is a drawing for explaining the support structure of the continuously variable transmission 1. (a) is a drawing schematically showing the B-B cross section in FIG. 2 (a). (b) is the C-C arrow view of FIG. 3 (a).

Figure 4:
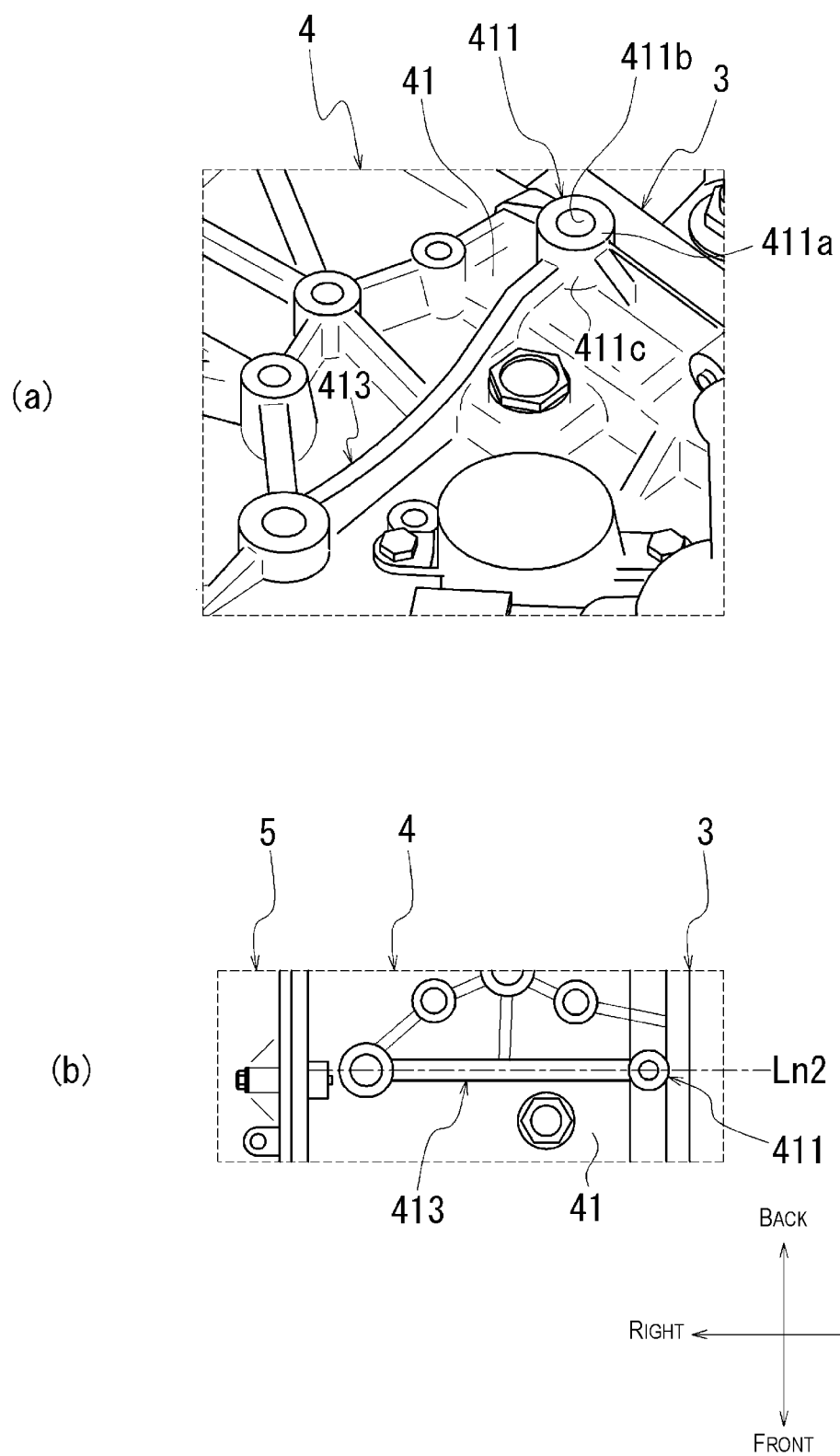
FIG. 4 is a drawing for explaining a case.

FIG. 4 is a drawing for explaining the case 4 of the transmission case 2. (a) is a perspective view around a rib 413 of the case 4 in FIG. 2 (b). (b) is a plan view of FIG. 4 (a). For convenience of the explanation, a stay member 9 is omitted.

Figure 5:
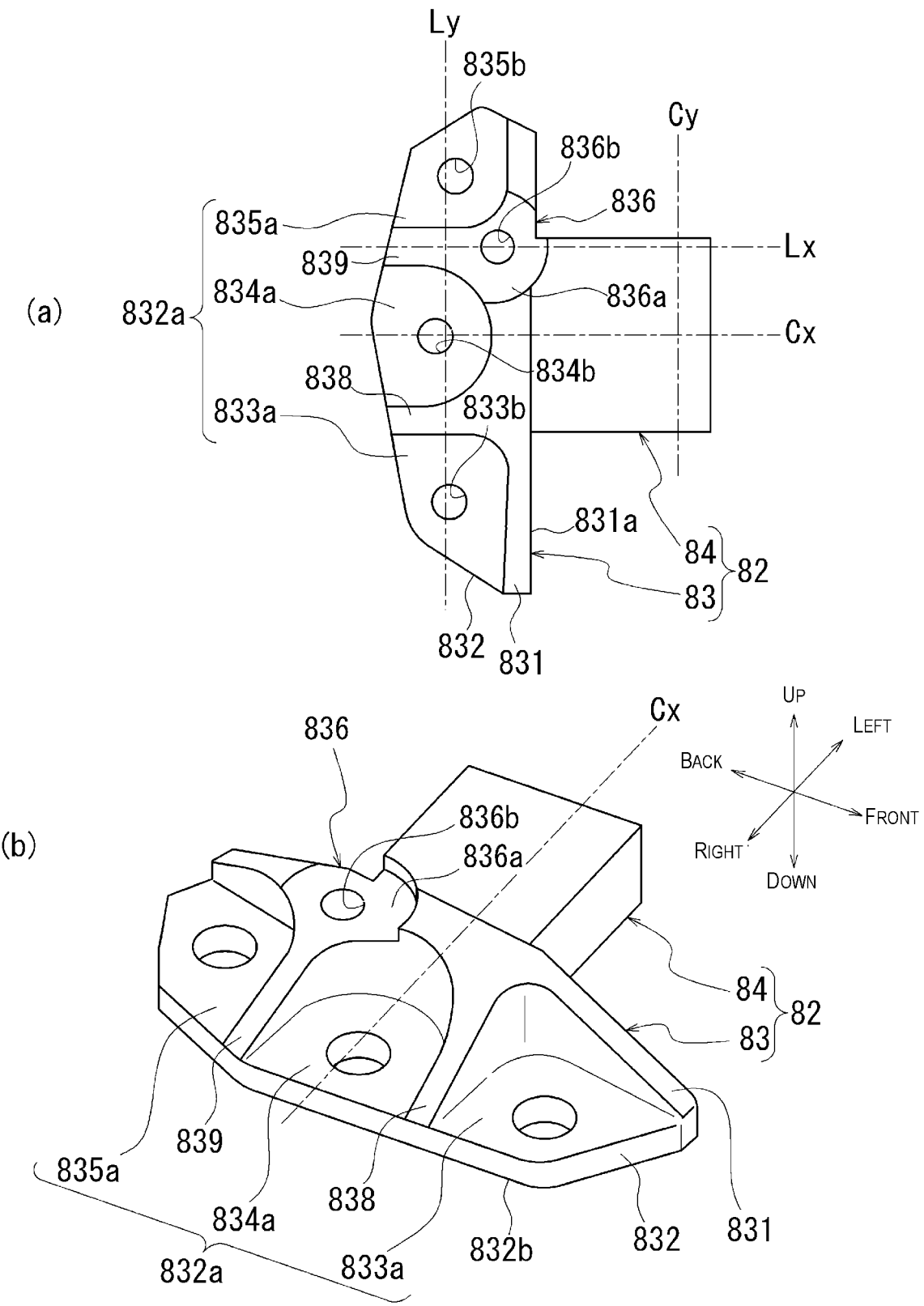
FIG. 5 is a drawing for explaining a mount member.

FIG. 5 is a drawing for explaining a mount bracket 82. (a) is a drawing showing only the mount bracket 82 in FIG. 3 (b). (b) is a perspective view of the mount bracket 82.

Figure 6:
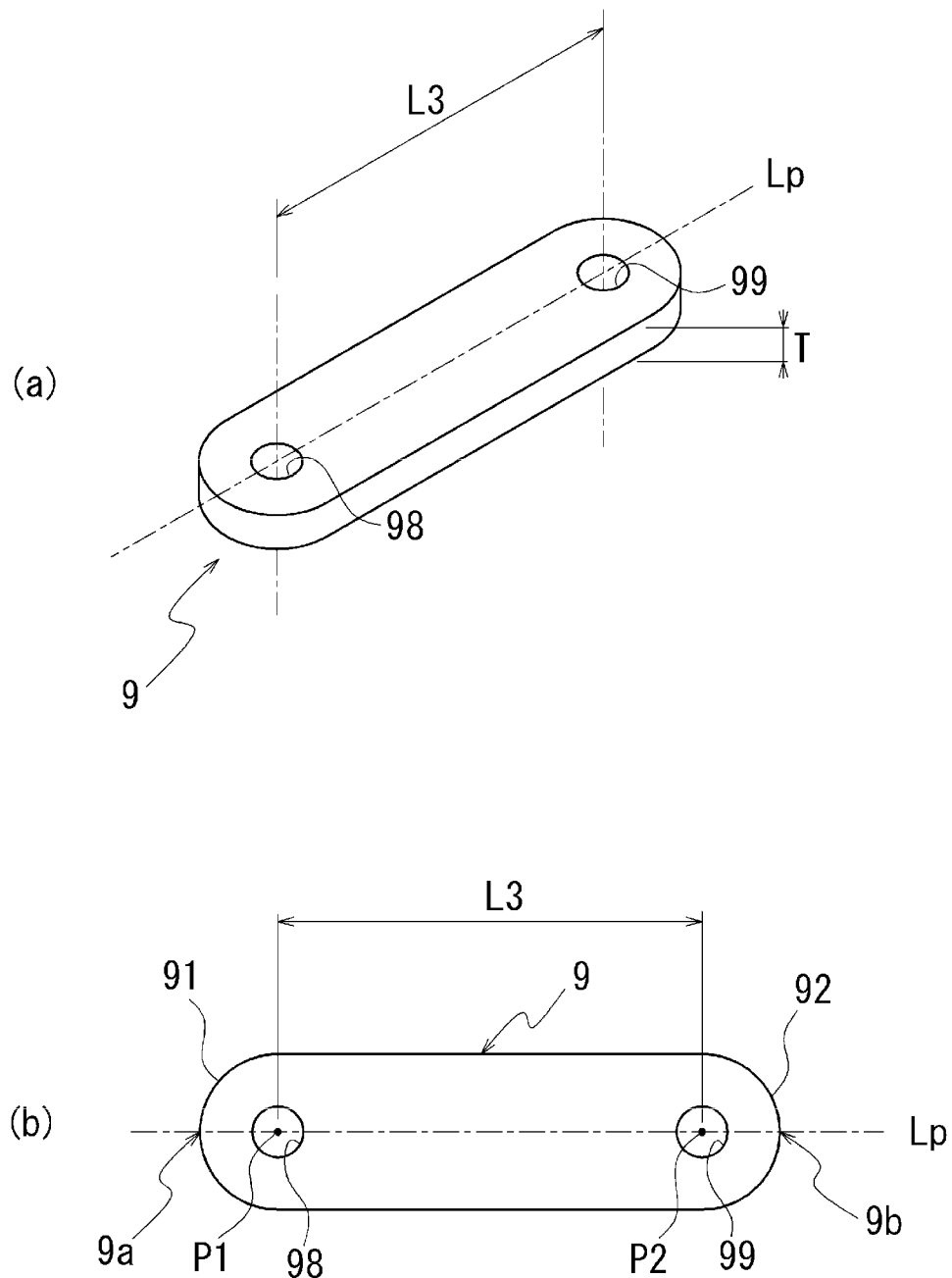
FIG. 6 is a drawing for explaining a stay member.

FIG. 6 is a drawing for explaining the stay member 9. (a) is a perspective view of the stay member 9. (b) is a plan view of the stay member 9.

Case 4

As shown in FIG. 3 (a), the rotating body such as the transmission mechanism or the friction engagement element, etc., noted previously is housed in a housing space K inside the case 4. The housing space K is surrounded by an annular wall part 41 of the case 4. The region surrounded by the annular wall part 41 of the case 4 opens to the side member 6L side in the left-right direction of the vehicle V. This opening is sealed by the side cover 3.

A flange part 42 joined with a flange part 32 of the side cover 3 is provided on the end part of the side cover 3 side of the annular wall part 41 in the left-right direction of the vehicle V (see FIG. 1, FIG. 3 (b)).

The flange part 42 extends outward from the annular wall part 41 in the thickness direction of the annular wall part 41 (up-down direction in FIG. 3 (a)). The flange part 42 is provided across the entire circumference in the circumferential direction of the annular wall part 41 (see FIG. 1). A plurality of boss parts 43 through which the bolts B are inserted from the side cover 3 side are provided on the flange part 42 at specified intervals in the circumferential direction (see FIG. 1).

As shown in FIG. 3 and FIG. 4, a boss part 411 is provided near the apex of the flange part 42 in the up-down direction of the vehicle V. The boss part 411 extends facing upward in the up-down direction from the flange part 42.

As shown in FIG. 4 (a), a tip surface 411a of the boss part 411 is a flat surface orthogonal to the up-down direction of the vehicle V. A bolt hole 411b is opened at the tip surface 411a.

The rib 413 is formed on a root 411c of the boss part 411. The rib 413 is provided straddling the side surface of the boss part 411 opposite the side cover 3 and the annular wall part 41. The rib 413 is provided across substantially the entire length of the annular wall part 41 along a straight line Ln2 parallel to the left-right direction of the vehicle V (see FIG. 4 (b)). The stay member 9 described later is fastened by bolts B to the boss part 411 in a state abutted on the tip surface 411a (see FIG. 3).

Side Cover 3

As shown in FIG. 3 (a), the side cover 3 is configured from a bottom wall part 30, a peripheral wall part 31 surrounding the bottom wall part 30, and the flange part 32 provided across the entire circumference of the opening end edge of the peripheral wall part 31. The flange part 32 is provided extending to outside from the peripheral wall part 31 in the direction parallel to the bottom wall part 30 (up-down direction in FIG. 3 (a)).

A bonding surface 42a of the flange part 42 and a bonding surface 32a of the flange part 32 are flat surfaces orthogonal to the overlapping direction of the flange parts 42, 32 (left-right direction in FIG. 3 (a)).

A plurality of bolt bosses 33 through which bolts B are inserted are provided in the flange part 32 at prescribed intervals in the circumferential direction (see FIG. 1). These bolt bosses 33 are provided at positions corresponding 1-to-1 with the boss parts 43 of the flange part 42.

A projecting part 35 is provided on a side surface 30a on the side opposite to the flange part 32 of the bottom wall part 30 in the left-right direction of the vehicle V. The projecting part 35 is configured from three projections 351, 352, 353 projecting from the side surface 30a of the bottom wall part 30 (see FIG. 1 and FIG. 3 (a)).

As shown in FIG. 1, these three projections 351, 352, 353 are aligned in a row with gaps open along the front-back direction of the vehicle V. A top surface 351a of the projection 351, a top surface 352a of the projection 352, and a top surface 353a of the projection 353 are respectively formed in a parallel surface orthogonal to the up-down direction as well as on the same flat surface.

Bolt holes 351b, 352b, and 353b are opened respectively on the top surface 351a of the projection 351, the top surface 352a of the projection 352, and the top surface 353a of the projection 353.

These bolt holes 351b, 352b, and 353b are respectively provided at positions that intersect a straight line Lm3 parallel to the front-back direction of the vehicle V.

The mount bracket 82 of a mount member 8L is connected by bolts B to the projecting part 35 of the side cover 3 (see FIG. 3).

Mount Member 8L

As shown in FIG. 3 (a) and FIG. 3 (b), the mount member 8L is attached to the side member 6L.

The mount member 8L is configured from a cylindrical base part 80, an elastic member 81 fitted into the inner diameter side of the base part 80, and the mount bracket 82 inserted and fitted in the elastic member 81.

As shown in FIG. 3 (b), the mount member 8L is attached to the side member 6L in a state with a center line Cx of the base part 80 following in the left-right direction of the vehicle V. Therefore, the center line Cx of the base part 80 is orthogonal to the longitudinal direction of the side member 6L (straight line Lm1).

In this state, a diameter line Cy of the base part 80 parallel to the front-back direction of the vehicle V is parallel to the longitudinal direction of the side member 6L (straight line Lm1).

The base part 80 is fixed to the side member 6L with support pieces 801, 802 interposed. The support pieces 801, 802 extend in mutually separating directions from outer circumferential surfaces 80a, 80a of the base part 80.

As shown in FIG. 2 (b), 3 (b), the support pieces 801, 802 are provided at the front side (bottom side in the drawing) and back side (top side in the drawing) of the base part 80 sandwiching the center line Cx.

The support pieces 801, 802 respectively extend in directions separating from the base part 80 in the diameter line Cy direction.

The support piece 801 and the support piece 802 have the same shape. In the explanation hereafter, the explanation is given using the support piece 801 as an example.

As shown in FIG. 3 (b), the support piece 801 is an item shaped by bending a band-shaped member. The support piece 801 is configured from a planar part 801a parallel to the center line Cx, and support parts 801c, 801c orthogonal to the planar part 801a.

A through hole 801b that penetrates the planar part 801a in the thickness direction is formed on the planar part 801a. The bolt B is inserted in this through hole 801b.

The base part 80 is fixed to the side member 6L by the bolt B in a state with the planar part 801a placed on the top surface 6a of the side member 6L.

The support parts 801c, 801c are provided at the side edges of one side and the other side of the planar part 801a in the enter line Cx direction of the base part 80. The support parts 801c, 801c are provided straddling the outer circumference of the base part 80 and the planar part 801a.

As shown in FIG. 3 (a), the elastic member 81 is fitted into the inner diameter side of the base part 80. One example of the material for the elastic member 81 is anti-vibration rubber.

The elastic member 81 has a full length L2 that is slightly longer than a full length L1 of the base part 80 in the center line Cx direction (L1<L2). Also, with the elastic member 81, in a state with the elastic member 81 fitted into the base part 80, an end part 81a of the side cover 3 side in the center line Cx direction is exposed inside the engine room R.

An outer diameter r1 of the end part 81a side of the elastic member 81 is formed to have a larger diameter than an outer diameter r2 of the base part 80 (r1>r2). This prevents movement of the elastic member 81 in the direction separating from the side cover 3 in the center line Cx direction.

A second bracket part 84 of the mount bracket 82 is inserted and fitted along the center line Cx direction in the elastic member 81. A first bracket part 83 of the mount bracket 82 projects from the end part 81a of the elastic member 81. The first bracket part 83 is exposed inside the engine room R. In other words, the mount bracket 82 in the mount member 8L (member of the case member side), and the base part 80 in the mount member 8L (member of the frame side) are connected with the elastic member 81 interposed.

The first bracket part 83 of the mount bracket 82 is connected with the side cover 3 in the inside of the engine room R, and is also connected with the case 4 with the stay member 9 interposed (see FIG. 3).

Mount Bracket 82

As shown in FIG. 3 (a) and FIG. 5, in the mount bracket 82, in the center line Cx direction, one side is the first bracket part 83, and the other side is the second bracket part 84. The first bracket part 83 and the second bracket part 84 are integrally formed.

The first bracket part 83 has a side wall 831 orthogonal to the center line Cx. At the bottom edge of the side wall 831, a bottom wall 832 is provided. The bottom wall 832 extends in the direction separating from the second bracket part 84 in the center line Cx direction. A surface 832a of one side and a surface 832b of the other side in the thickness direction of the bottom wall 832 are flat surfaces parallel to the center line Cx.

Ribs 838, 839 are provided straddling the side wall 831 and the bottom wall 832.

As shown in FIG. 5 (a), the rib 838 and the rib 839 are provided with a gap opened on a straight line Ly parallel to the diameter line Cy. The ribs 838, 839 each have an inclined plane formed by the top edge part of the side wall 831 and the tip part of the bottom wall 832 being connected by a straight line. In the side view, the ribs 838, 839 form a substantially right triangle shape (see FIG. 3 (b)).

The top surface 832a of the bottom wall 832 is partitioned into three regions (833a, 834a, 835a) by the ribs 838, 839. Through holes 833b, 834b, 835b that penetrate the bottom wall 832 in the thickness direction respectively are opened in each region. These through holes 833b, 834b, 835b are each provided at positions that intersect the straight line Ly.

Here, a counterbore part 836 is formed in the region at which the top edge part of the side wall 831 and the rib 839 intersect in the first bracket part 83. A bolt hole 836b is opened in a bearing surface 836a of the counterbore part 836. The bolt hole 836b is formed on an extension line of the rib 839 in the straight line Lx direction parallel to the center line Cx (see FIG. 5 (a)).

The second bracket part 84 extends from the side surface 831a of the side opposite to the ribs 838, 839 in the side wall 831. The second bracket part 84 extends from the top edge part side of the side wall 831 of the first bracket part 83 (see FIG. 3 (a)).

The second bracket part 84 is a plate shaped member extending in the direction separating from the first bracket part 83 along the center line Cx. The length of the second bracket part 84 in the center line Cx direction is slightly longer than the length of the base part 80 or the elastic member 81 of the mount member 8L.

In a state with the second bracket part 84 fitted into the elastic member 81, the first bracket part 83 is exposed inside the engine room R. Also, the first bracket part 83 has the following positional relationship with respect to the transmission case 2 (side cover 3, case 4).

(i) The bottom wall 832 of the first bracket part 83 overlaps on the top part of the projecting part 35 of the side cover 3 (see FIGS. 2 and 3).

(ii) The tip surface 411a of the boss part 411 of the case 4 and the bearing surface 836a of the counterbore part 836 of the first bracket part 83 are flush (see FIG. 3 (a)).

(iii) The center of the bolt hole 411b of the boss part 411, the center of the bolt hole 836b of the counterbore part 836, and the rib 839 are positioned on the same straight line Lx (see FIG. 3 (b)).

In the positional relationship in (i) noted above, the top surfaces 351a, 352a, 353a of the projections 351, 352, 353 (see FIG. 1) abut across substantially the entire surface of the bottom surface 832b of the bottom wall 832 of the first bracket part 83 (see FIG. 3 (a)). The bolt holes 351b, 352b, 353b of the projections 351, 352, 353 (see FIG. 1) and the through holes 833b, 834b, 835b of the bottom wall 832 (see FIG. 5 (b)) respectively overlap 1-to-1.

Specifically, by screwing in bolts B that penetrate the through holes 833b, 834b, 835b of the mount bracket 82 side respectively in the bolt holes 351b, 352b, 353b of the projections 351, 352, 353 of the side cover 3 side, the side cover 3 is connected to the mount bracket 82.

In the positional relationship in (ii) and (iii) noted above, the stay member 9 abuts across the entire surface on the tip surface 411a of the boss part 411 and the bearing surface 836a of the counterbore part 836.

The stay member 9 is suspended between the case 4 and the mount bracket 82 with the bolts B screwed into the bolt holes 411b, 836b being interposed.

Stay Member 9

As shown in FIG. 6 (a), the band-shaped stay member 9 has the same thickness T across the entire length of the longitudinal direction. The one side and the other side in the thickness direction of the stay member 9 are flat surfaces orthogonal to the thickness direction.

As shown in FIG. 6 (b), curved surface processing is implemented on a one end 9a side and an other end 9b side of the longitudinal direction of the stay member 9. On the outer circumference 91 of the one end 9a side and the outer circumference 92 of the other end 9b side of the stay member 9, an approximate arc shape is formed with centers P1, P2 positioned on a straight line Lp that passes through the middle of the width direction of the stay member 9.

Through holes 98, 99 that penetrate the stay member 9 in the thickness direction are formed on the stay member 9. The centers of the through holes 98, 99 match the arc shaped centers P1, P2.

A gap L3 between the through hole 98 and the through hole 99 in the straight line Lp direction is the same gap as the gap between the bolt hole 411b of the boss part 411 in the straight line Lx direction (see FIG. 3 (b)), and the bolt hole 836b of the bearing surface 836a (see FIG. 3 (b)).

Here, as noted above, the tip surface 411a of the boss part 411 (see FIG. 3 (a)) and the bearing surface 836a of the counterbore part 836 are arranged to be flush. Also, the center of the bolt hole 411b of the boss part 411 and the center of the bolt hole 836b of the counterbore part 836 are positioned on the same straight line Lx (see FIG. 3 (b)).

As shown in FIG. 3 (a), the stay member 9 is placed straddling the tip surface 411a of the boss part 411 and the bearing surface 836a of the counterbore part 836 of the mount bracket 82. In this state, the longitudinal direction of the stay member 9 (straight line Lp) matches the straight line Lx (see FIG. 3 (b)). The through holes 98, 99 of the stay member 9 respectively overlap the bolt hole 411b of the boss part 411 and the bolt hole 836b of the counterbore part 836.

By doing this, the stay member 9 is suspended between the case 4 and the mount bracket 82 with the bolts B screwed into the bolt holes 411b, 836b being interposed.

As shown in FIG. 3 (a), in the mount bracket 82, the first bracket part 83 of one side in the center line Cx direction is directly fixed to the projecting part 35 of the side cover 3, and also is indirectly fixed to the case 4 with the stay member 9 interposed.

Also, the second bracket part 84 of the other side in the center line Cx direction is inserted and fitted inside the elastic member 81 that is housed inside the cylindrical base part 80 of the mount member 8L, and the second bracket part 84 is attached to the side member 6L with the mount member 8L interposed.

Here, the center line Cx of the base part 80 is orthogonal to the longitudinal direction of the side member 6L (straight line Lm1: see FIG. 3 (b)).

Also, the stay member 9 is suspended between the first bracket part 83 and the case 4 in the straight line Lx direction parallel to the center line Cx. Specifically, the longitudinal direction of the stay member 9 is orthogonal to the longitudinal direction of the side member 6L (straight line Lm1).

As noted above, the mount bracket 82 is fixed to the projecting part 35 of the side cover 3 side using three bolts B, and there are three fastening points by the bolts B between the mount bracket 82 and the side cover 3. These three points are set with gaps open in the front-back direction of the vehicle V.

Also, with this embodiment, the mount bracket 82 is also fixed to the case 4 with the stay member 9 interposed, and there is one fastening point by the bolt B between the mount bracket 82 and the case 4.

The side cover 3 and the case 4 are both constituent elements of the transmission case 2. With this embodiment, there is a total of four fastening points between the mount bracket 82 and the transmission case 2 side.

Also, the fastening points (three) with the side cover 3 and the fastening point (one) with the case 4 are set with gaps open in the straight line Lx direction (with this embodiment, the vehicle width direction).

For that reason, the rigidity strength of the support structure of the transmission case 2 is improved by the following actions.

(a) By the side cover 3 and the case 4 which have different natural frequencies being integrally connected by the mount bracket 82, the natural frequency rises for the entire transmission case 2.

(b) By the fastening points (three) with the side cover 3 and the fastening point (one) with the case 4 being set with a gap opened in the vehicle width direction, the rigidity with respect to vibration in the vehicle width direction (vibration that falls in the left-right direction of the vehicle) is improved.

The stay member 9 is suspended between the boss part 411 and the first bracket part 83 in a state with the longitudinal direction matched to the straight line Lx direction.

Here, the rib 413 is positioned at the side opposite to the stay member 9 sandwiching the boss part 411 in the straight line Lx direction. The rib 413 is provided along the straight line Ln2 direction (see FIG. 4 (b)). In this state, the straight line Ln2 and the straight line Lx are aligned on a straight line seen from the up-down direction (see FIG. 3 (b)).

Thus, the rib 413 extends in the direction that extends in the longitudinal direction of the stay member 9 (see FIG. 5 (b)).

This further increases the rigidity of the stay member 9 in the longitudinal direction, making it strong with respect to vibration in that direction.

Wire Harness H

Figure 7:
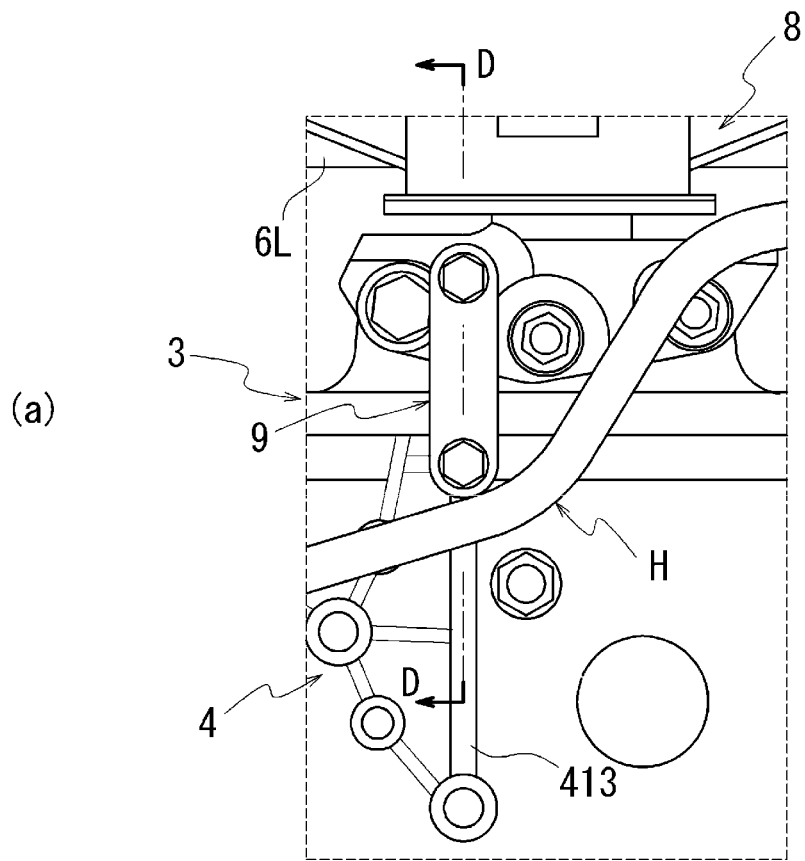
FIG. 7 is a drawing for explaining placement of a wire harness.
Figure 7:
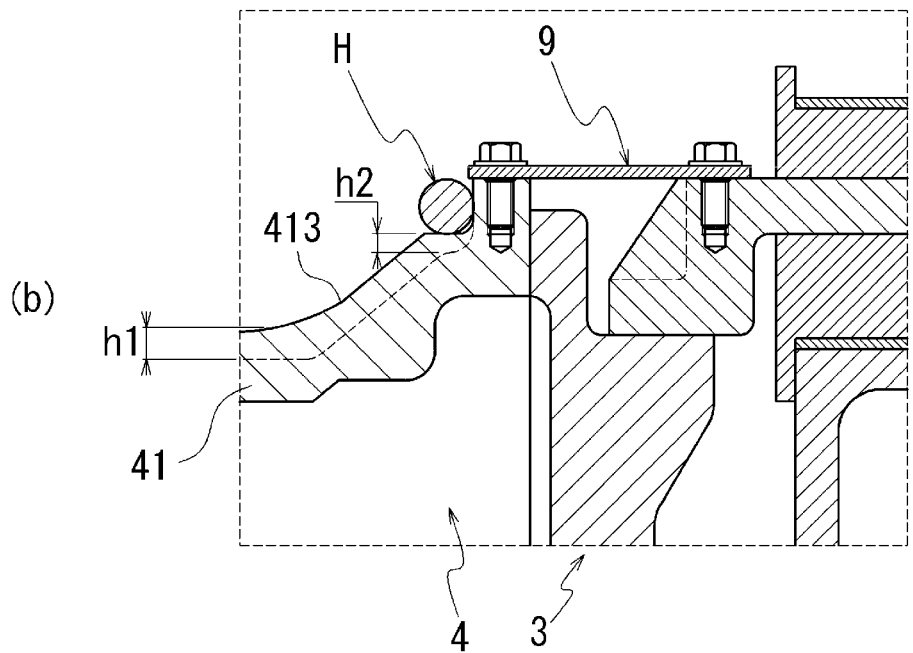

FIG. 7 is a drawing for explaining the placement of a wire harness H. (a) is a drawing for explaining the state with the wire harness H creeping on the transmission case 2 shown in FIG. 2 (a). (b) is a drawing that schematically shows the D-D cross section of FIG. 7 (a).

As shown in FIG. 7 (a), the wire harness H is placed so as to creep on the side cover 3 and the case 4 top surface. This wire harness H is placed crossing the rib 413.

In this embodiment, as shown in FIG. 7 (b), in the rib 413, a projection height h2 of the region of the boss part 411 side is set to be lower than a projection height h1 of another region (h1>h2).

Here, if a low height part is not provided in the rib 413, the wire harness H needs to be routed in a shape that goes over the rib 413 in the part that overlaps the rib 413. Having done that, it is necessary to make the overall length of the wire harness H longer by the amount going over the rib 413.

In contrast to this, with this embodiment, by lowering the projection height of the rib 413 of the boss part 411 to have the wire harness H pass through this low height part, the full length of the wire harness H being made longer is prevented.

The vehicle V comprising the continuously variable transmission 1 of this embodiment has the following configuration.

(1) There is the transmission case 2 (case member) supported on the side member 6L (frame) of the vehicle body with the mount member 8L interposed.

There is the stay member 9 suspended between the boss part 411 of the case 4 of the transmission case 2, and the mount bracket 82 (member of the case member side) in the mount member 8L.

The straight line Lx along the longitudinal direction of the stay member 9 intersects the straight line Lm1 along the longitudinal direction of the side member 6L.

There is the rib 413 extending in the direction that extends in the longitudinal direction of the stay member 9 on the root 411c of the boss part 411.

The support structure of the transmission case 2 side in the mount member 8L contributes to the rigidity. Thus, as noted above, the rigidity is increased by providing the stay member 9. Furthermore, by having the longitudinal direction of the stay member 9 and the longitudinal direction of the side member 6L intersect, it is possible to increase rigidity in that direction. In fact, by providing the rib 413 extending in the direction that extends in the longitudinal direction of the stay member 9 on the root 411c of the boss part 411, the support rigidity in the longitudinal direction of the stay member 9 is further increased, and it is possible to build a strong support structure with respect to vibration in that direction.

The vehicle V comprising the continuously variable transmission 1 of this embodiment has the following configuration.

(2) The transmission case 2 includes the case 4 (case body member), and the side cover 3 (cover member) connected with the case 4.

The mount bracket 82 in the mount member 8L is supported by the side cover 3, and the boss part 411 and the rib 413 are formed on the case 4.

To make it so the size of the mount member 8L does not become large, the mount bracket 82 of the transmission case 2 side in the mount member 8L is preferably placed at the side near the mount member 8L. For that reason, it is preferable that the mount bracket 82 be connected with the side cover 3, and be supported by the side cover 3.

Meanwhile, at the side cover 3 side, when forcibly attempting to create space because there is not enough space for suspension of the stay member 9 or space for placing the rib, the size of the side cover becomes larger.

For that reason, by configuring as noted above, by forming the boss part 411 and the rib 413 in the case 4 where space can be taken, and also having the mount bracket 82 supported by the side cover 3, it is also possible to ensure high support rigidity without making the mount member 8L larger scale.

The vehicle V comprising the continuously variable transmission 1 of this embodiment has the following configuration.

(3) The mount bracket 82 is connected to the transmission case 2 using a plurality of bolts B (fasteners).

The plurality of bolts B are placed mutually overlapping along the straight line Ly direction (direction intersecting the longitudinal direction of the stay member 9).

If an arrangement is used in which the plurality of bolts B do not overlap in one direction (a pure triangle placement, for example), though the rigidity of both the longitudinal direction of the side member 6L and the direction intersecting that are increased, there is an increase in the physical constitution in the direction intersecting the longitudinal direction of the side member 6L.

In light of that, by configuring as noted above, by using a configuration that, in the direction intersecting the longitudinal direction of the stay member 9, ensures rigidity in that direction by the plurality of bolts B, and in the longitudinal direction of the stay member 9, ensures rigidity by the stay member 9, it is possible to establish both improvement in rigidity and suppression of an increase in the physical constitution.

The vehicle V comprising the continuously variable transmission 1 of this embodiment has the following configuration.

(4) The wire harness H is placed at a position passing over the rib 413.

The height h2 of the rib 413 of the region overlapping the wire harness H is set to be lower than the height h1 of the rib of the region adjacent to the region overlapping the wire harness H.

By configuring in this way, in the position at which the wire harness H goes over the rib 413, the higher the rib 413, the more it is necessary to make the wire harness H longer accordingly, but this is suitably prevented.

Above, embodiments of the invention of this invention were explained, but the invention of this application is not limited only to the modes shown in these embodiments, and can be suitably modified within the scope of the technical concept of the invention.

The invention claimed is:

1. A vehicle comprising:
a case member supported by a frame of a vehicle body with a mount member being interposed;
a stay member suspended between a boss part of the case member and a member of a case member side in the mount member, a longitudinal direction of the stay member intersecting a longitudinal direction of the frame; and
a rib extending in the case member in a direction that is an extension of the longitudinal direction of the stay member at a root of the boss part.

2. The vehicle according to claim 1, wherein
the case member includes a case body member and a cover member connected to the case body member, and
the member of the case member side in the mount member is supported by the cover member, and the boss part and the rib are formed on the case body member.

3. The vehicle according to claim 1, wherein
the member of the case member side in the mount member is connected to the case member with a plurality of fasteners, and
the plurality of fasteners are placed to mutually overlap along a direction intersecting the longitudinal direction of the stay member.

4. The vehicle according to claim 1, wherein
a wire harness is placed at a position passing over the rib, and
a height of the rib in a region overlapping the wire harness is lower than a height of the rib in a region adjacent to the region overlapping the wire harness.

* * * * *